United States Patent [19]

ab der Halden et al.

[11] Patent Number: 4,551,845

[45] Date of Patent: Nov. 5, 1985

[54] SYSTEM FOR PHASING DIGITAL TRAINS AND APPLICATION THEREOF TO THE SWITCHING OF SAID TRAINS

[75] Inventors: Charles H. ab der Halden, Tregastel; Pierre H. Berenguier, Paris, both of France

[73] Assignee: Societe Anonyme de Telecommunications, Paris, France

[21] Appl. No.: 374,699

[22] Filed: May 4, 1982

[30] Foreign Application Priority Data

May 6, 1981 [FR] France ............................... 81 09002

[51] Int. Cl.[4] .......................... H04L 7/00; H04L 1/22
[52] U.S. Cl. ...................................... 375/40; 371/57; 340/825.01; 375/108; 375/118
[58] Field of Search ............... 375/118, 108, 111, 116, 375/119, 40, 100; 370/100, 103, 89, 94; 371/47, 57, 61, 68; 340/825.2, 825.21, 825.01; 455/137, 138, 139

[56] References Cited

U.S. PATENT DOCUMENTS

| | | | |
|---|---|---|---|
| 4,052,670 | 10/1977 | Watanabe et al. | 375/118 X |
| 4,119,796 | 10/1978 | Jones | 375/118 X |
| 4,301,537 | 11/1981 | Roos | 375/108 |
| 4,316,285 | 2/1982 | Bobilin et al. | 375/108 |
| 4,368,531 | 1/1983 | Chopping | 375/118 X |

*Primary Examiner*—Benedict V. Safourek
*Attorney, Agent, or Firm*—Holman & Stern

[57] ABSTRACT

The instant invention relates to the phasing of digital trains containing identical data signals and clock signals of the same frequency. A data testing device compares the coincidence of the bits by packets of bits contained in the signals for emitting a signal (NoCo), if there is at least one non-coincidence in a packet. The testing device delivers a poor base relation signal (ABSCORR) after q non-coincidences. If the testing device has not delivered any non-coincidence pulse for a time $t_l$, a phase discriminator delivers a phase non-matching signal (ABSPHA). A phase change demand signal (PAP) is delivered by the testing device either upon appearance of the signal (ABSCORR) or the signal (ABSPHA).

The invention is appropriate for switching purposes in microwave link transmission.

2 Claims, 16 Drawing Figures

| a | b | c | |
|---|---|---|---|
| 0 | 0 | 0 | 166 |
| 1 | 0 | 0 | 167 |
| 1 | 1 | 0 | 168 |
| 0 | 1 | 0 | 169 |
| 0 | 1 | 1 | 170 |
| 1 | 1 | 1 | 171 |
| 1 | 0 | 1 | 172 |
| 0 | 0 | 1 | 173 |

FIG. 11

SYSTEM FOR PHASING DIGITAL TRAINS AND APPLICATION THEREOF TO THE SWITCHING OF SAID TRAINS

BACKGROUND OF THE INVENTION

The present invention relates to the digital transmission of information and more particularly to the phasing of digital trains with a view to satisfying a switching order, said trains containing identical data signals and clock signals of the same frequency.

Modern digital transmission systems require processing, maintenance and safety systems of increasingly higher performance, all the more so as the rates increase (2 Mbit/s, 8 Mbit/s, 34 Mbit/s, 2×34 Mbit/s, 140 Mbit/s). Such requirements are also met with in the transmission of information both by radio beams and by electrical cables or optical fibres.

The device according to the invention is applied to any digital transmission system conducting digital information via two different paths, the choice of the path being a function of determined criteria particular to the system or being controlled from the outside.

In particular, in the digital transmission systems employing radio beans, a backup channel is added to the n channels in operation, which backup channel is capable of replacing an unavailable channel over a whole switching section. The usual reasons for such switching orders are fadings on a service channel, maintenance or defects.

A digital train switching device has already been described in Applicant's French Patent Application No. 79 18 479. It evokes the necessity that switching does not introduce any additional transition in the clock signal. In fact, such a switching must be effected very rapidly after a demand issuing from the reception logic further for example to the result furnished by a quality appreciator, the order of switching being transmitted due to the order channels. This switching must also be effected without loss nor addition of information. This condition is imperative as such a defect would cause losses of synchronisation of the downstream equipment.

Millions of bits could be lost in this way. Moreover, it is desirable that this switching does not introduce any erroneous information, in particular in the case of handling the backup channel for servicing.

Pat. No. 79 18 479 makes it possible to smooth the clock phase jump at the moment of switching, but only if this jump is not too considerable.

However, it is very difficult to foresee the phase difference of the clock signals and the data of each channel, a backup channel having to be operational virtually instantaneously and equally for n channels.

In fact, the various digital trains present shifts which may attain several clock periods due to the differences in transmission medium, ageing of the equipment, variations in temperature, etc.

It is therefore necessary to prepare the trains to be switched in order to adapt them in phase before subjecting them to the switching of the Patent mentioned above. Furthermore, the phase adaptation of the trains must be compatible with the gauges admissible by the downstream equipment, for example the interfaces.

French Patent Application No. 2 462 065 in particular teaches effecting switching only after the phasing of the clock signals and the synchronism of the binary rates of the signals. A coincidence test is also effected, but only one shift order is sent each time a predetermined number of non-coincidences are observed, until there is effectively coincidence.

The present invention concerns more particularly the tests of preparation for making a demand for phasing of the digital trains.

It is another object of the present invention, further to the tests and to a demand for phasing, to effect actual phasing satisfactorily, whatever the contents of the digital trains.

The object of the invention is, on the one hand, to control the phase changes, and, on the other hand, to carry them out without risk of exceeding the jitter admissible for the downstream equipment.

SUMMARY OF THE INVENTION

To this end, the present invention relates to a system for phasing two digital trains, said trains containing identical data signals and clock signals of the same frequency, comprising a data coincidence testing device which compares the coincidence of the bits by packets of bits contained in said data signals and emits a non-coincidence signal (NoCo) if there is at least one non-coincidence in a packet, said testing device delivering a phase change signal (PAP), wherein the testing device emits a poor phase relation signal (ABSCORR) as soon as there have been q non-coincidences, the number q being appropriately chosen as a function of the processed data signal; if the testing device has not furnished any non-coincidence pulse for a predetermined time $t_1$, a phase discriminator furnishes a signal (ABSPHA) indicative of the phase non-matching of the clock signals, and the phase change demand signal (PAP) is produced either upon the appearance of a poor phase relation signal (ABSCORR) or upon that of a phase non-matching signal (ABSPHA).

According to another feature of the invention, the length of a packet is inversely proportional to the minimum richness in transitions and to the time distribution of said data signals.

According to another feature of the invention, the time $t_1$ is long when said data signal is poor in transitions and is short in the contrary case.

According to a further feature, the invention comprises a phase change device varying the phase of the so-called backup digital train discontinuously, for example by jump of step equal to 1/ iu, p being a predetermined whole number, following each phase change demand signal PAP, iu being equal to the period of the entering signal Hi.

Moreover, the discrete sequence of the variable phases is passed through in a direction of advance, then in a direction of delay, within a range corresponding to n bits.

The system of the invention makes it possible to effect a rapid switching of a radio channel degraded by a fading, in such a time, of the order of a few milliseconds, that switching takes place before the quality has reached a level inacceptable even for the most rapid fadings.

The system of the invention, due to its adaptation on the backup channel, avoids the problems of convergence connected with the use of a delay device not able to function on a channel in service.

The system of the invention leads to a simplication and to a saving of the radio channel reception devices.

The system of the invention ensures the permanent monitoring, by displaying the delays, of the balancing of the propagation times of the radio channels and possible rebalance thereof without interrupting the traffic.

The system of the invention is easily adapted to more or less large ranges of variable phase shifts, simply by increasing the data buffers without modifying the other elements of the system.

The system of the invention is easily adapted to the various technologies as a function of the rates of the digital train.

BRIEF DESCRIPTION OF THE DRAWINGS

The invention will be more readily understood on reading the following description with reference to the accompanying drawings, in which:

FIG. 11 is a representation of the cyclic code controlling phase shifting.

DETAILED DESCRIPTION OF THE PREFERRED EMBODIMENT OF THE INVENTION

Figure 1:
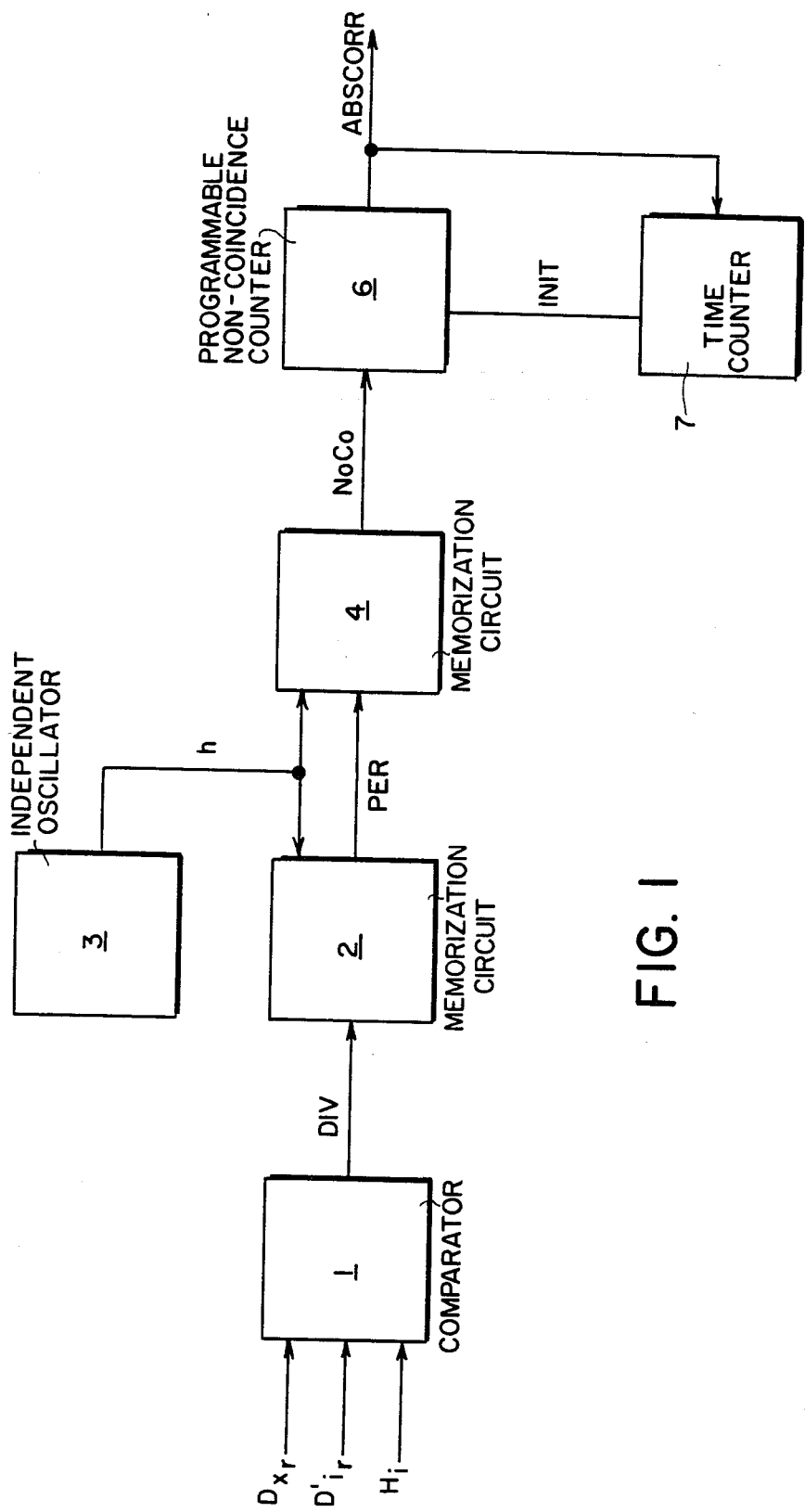
FIG. 1 is a block diagram of a digital data correlation circuit according to the invention.
Figure 2:
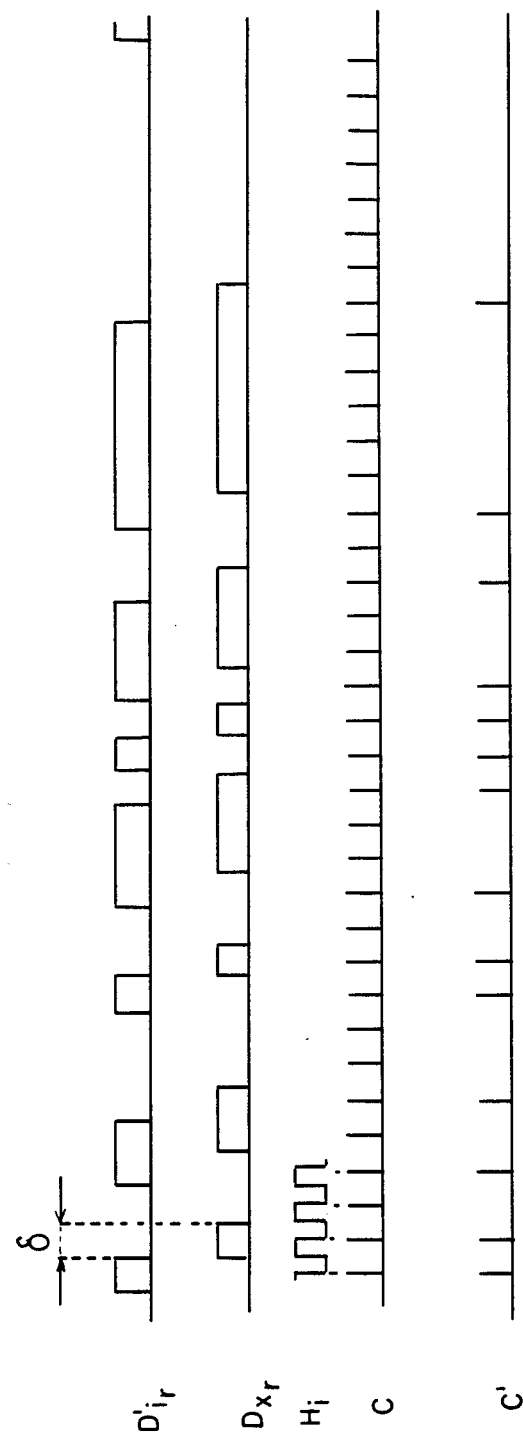
FIG. 2 is a timing chart of the rapid part of FIG. 1.

Referring now to the drawings, and firstly to FIG. 1, two data trains $D'_{ir}$ and $D_{xr}$ come from two different paths and should be identical. The non-coincidence of the two data trains $D'_{ir}$ and $D_{xr}$ is sought according to the invention. A clock signal $H_i$, having the same nominal frequency as the clock signals $H'_{ir}$ and $H_{xr}$ of said trains but a determined phase, times the operation of a comparator 1 which receives the signals $D'_{ir}$ and $D_{xr}$. This comparator 1 compares the signals $D'_{ir}$ and $D_{xr}$ previously synchronized by $H_i$ and furnishes at the output a signal DIV (divergence) indicative of the data coincidence test. For a shift of one signal with respect to the other (FIG. 2), the instants of comparison (signal C) correspond to the falling edges of the clock signal $H_i$. At certain instants (signal C') of this clock signal, a non-coincidence is detected of the two data signals $D'_{ir}$ and $D_{xr}$. Another non-coincidence signal DIV is further illustrated by a non-zero signal (non-identical bits $b_1$ and $b_3$) in FIG. 3.

An independent oscillator 3, of frequency much lower than the rate of the digital trains, furnishes a square signal h defining a packet of bits of fixed length p (p being a whole number), corresponding to the period of this signal h.

The non-coincidence signal DIV is stored in a memorization circuit 2 until the end of a packet defined by h which is also applied thereto. At the output, the circuit 2 furnishes a signal PER (erroneous packet) indicating that a packet of bits contains at least one non-coincidence between the data $D_{xr}$ and $D'_{ir}$. Thus, this signal PER is not sensitive to a second error which may exist in the same packet.

In the memorization circuit 4, the signal PER is memorized for the duration of the following packet, by applying the signal h to the input of the circuit 4.

The circuit 4 emits at the output of a non-coincidence pulse NoCo equal to 1 for a predetermined fixed time if there is at least one non-coincidence of data in the preceding packet. This fixed time of emission of the pulse NoCo must in fact be compatible with the functioning of the slow part of the data correlation device. The above-described part formed by the elements 1, 2, 3, 4 functions at the rhythm of $H_i$ and is a voluntarily reduced "rapid" part having regard to energy consumption.

Figure 3:
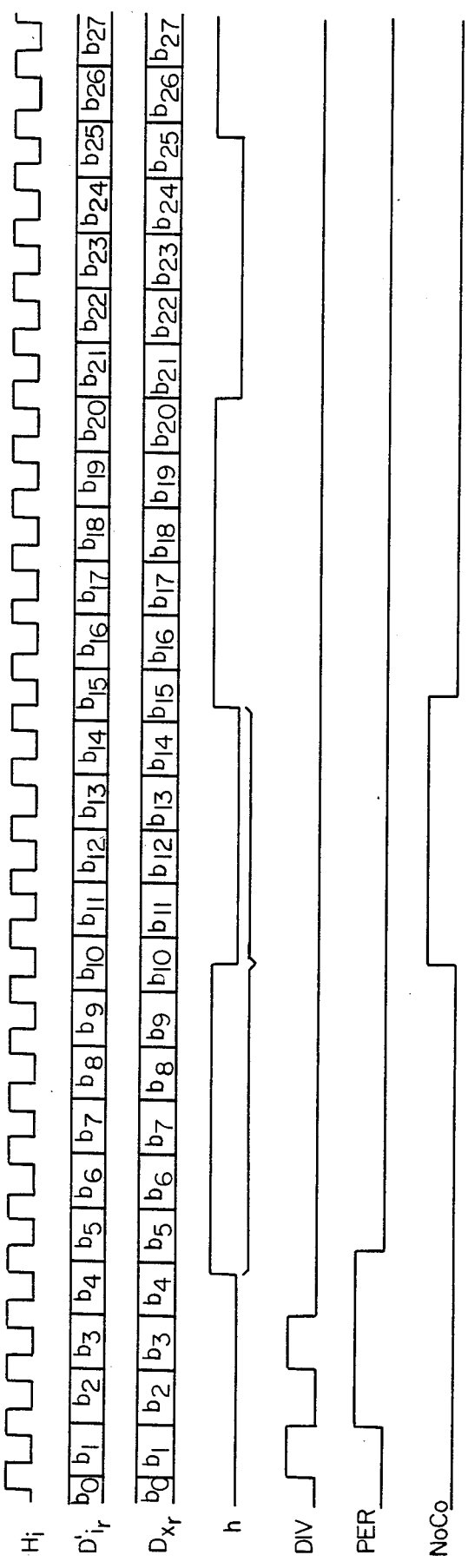
FIG. 3 is a timing chart of the slow part of FIG. 1.
Figure 4:
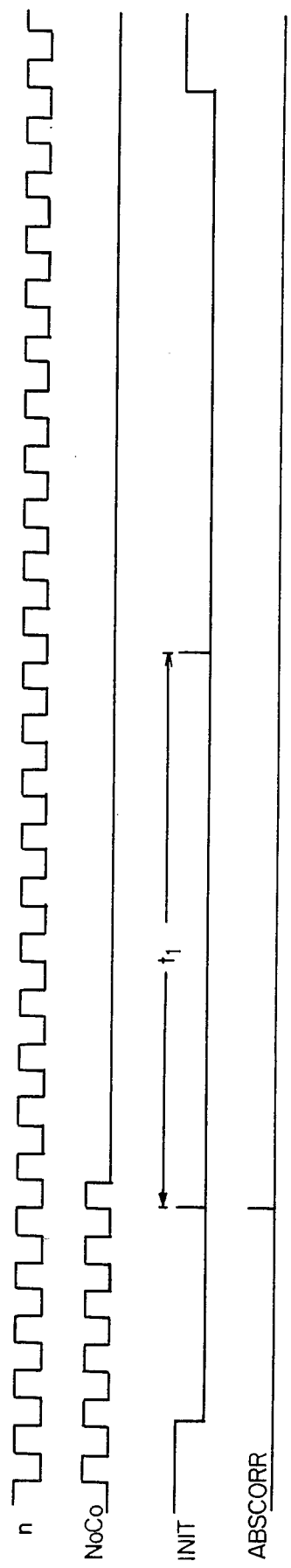
FIG. 4 is a timing chart of the detection of non-coincidence of two digital trains.

The signal NoCo is applied to the input of a programmable non-coincidence counter 6, which counts the pulses NoCo between two pulses shifted by $t_1$ of a signal INIT (initialization) furnished by a time counter 7. If this counter 6 arrives at its maximum count q, which is predetermined value, before the arrival of another pulse of signal INIT, it emits an absence of correlation pulse ABSCORR at the output (cf. FIG. 4). If the pulse ABSCORR is produced before the end of time $t_1$, the time counter 7 is initialized. In this case, and when the counter 7 arrives at $t_1$, a pulse INIT will initialize the programmable counter 6. The time $t_1$ is chosen to guarantee the recognition of the absence of correlation on the train poorest in transitions. In fact, the data conducted normally through the radio beams contain a raster of actual data and a certain number of words or bits for systematic insertion. Thus, the frequency of the signal h, therefore the length of a packet, is one of the parameters making it possible to optimize the correlator according to the invention. The length of a packet must take into account the richness in transitions of the data in question as well as the time distribution thereof. FIG. 3 shows a particular case where the length p of a packet is equal to 10 bits.

Similarly, the parameter q, counting the pulses NoCo between two pulses INIT, is chosen so that the correlator according to the invention is insensitive to the errors which may exist on the data and for pq to be compatible with the admissible jitter gauges.

Such a data correlator device according to the invention is advantageously applied in the case of a demand for switching of beams to allow a switching demand $Tr_i$ issuing from a channel of order i indicating that the channel i desires to be on standby or, if it is already on standby, that it no longer wishes to be. The signal $Tr_1$ is at 1 when the channel i is in normal reception and at 0 when the channel i is backed up. Let us call x the backup channel. The train $D'_{ir}$ associated with its clock $H'_{ir}$ is then compared with the train $D_{xr}$ associated with its clock $H_{xr}$.

Figure 5:
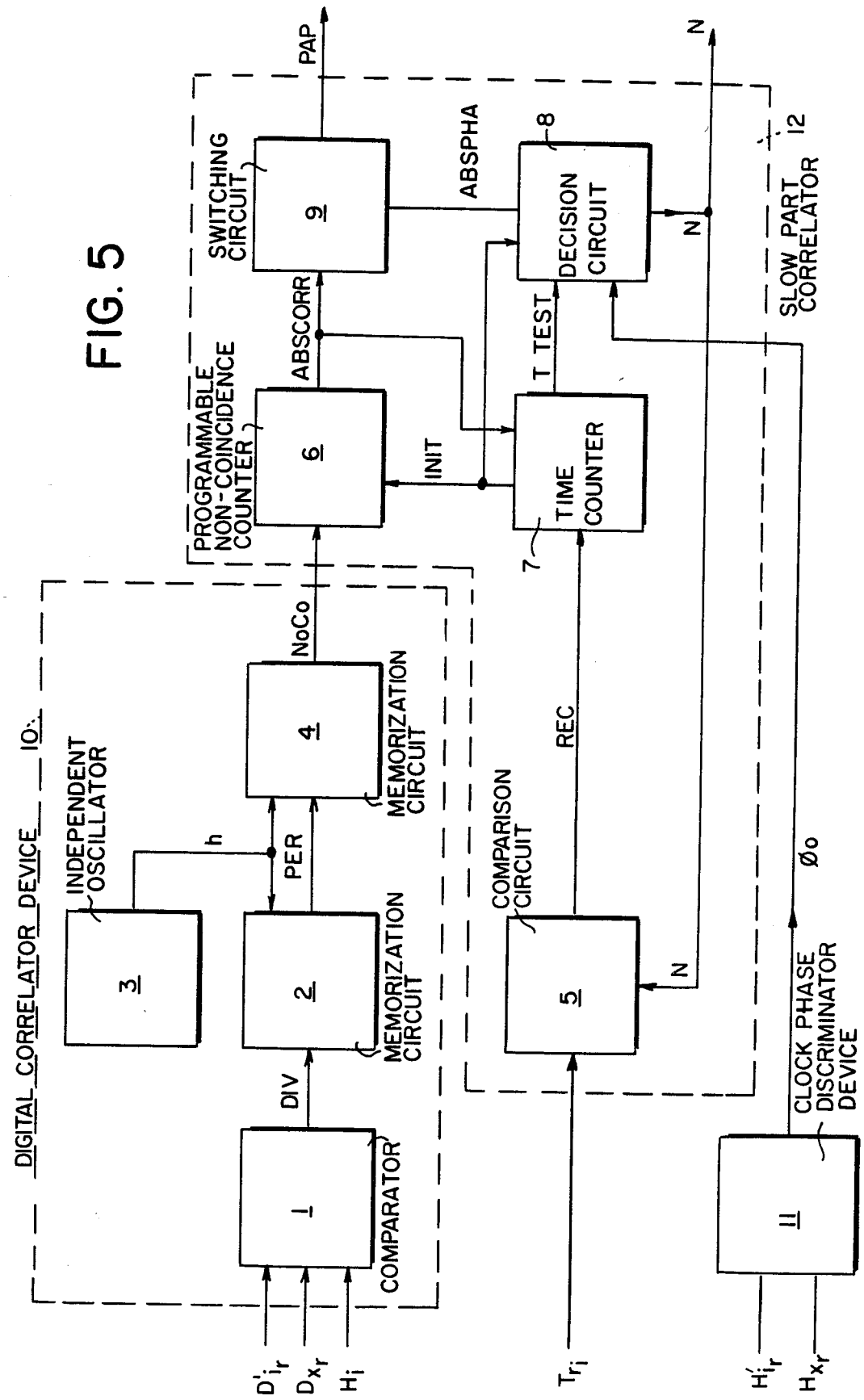
FIG. 5 is a diagram of the preferred embodiment of the test on the data and on the clocks.

FIG. 5 shows a clock phase discriminator device 11 which receives the clock signals $H_{xr}$ and $H'_{ir}$ and furnishes at the output a signal $\phi_o$ indicative of the phase shift between the clocks of the two trains.

Whilst the digital correlator device 10, comprising the elements 1, 2, 3 and 4 of FIG. 1, tests the non-coincidences of the data, the clock phase discriminator 11 furnishes a state of the phase shift of the clocks at the input of a decision circuit 8.

If $\phi_o=0$, there is a phase shift which is inacceptable as it is too considerable and the circuit 8 delivers a signal ABSPHA, indicating the absence of phasing of the clocks of the two digital trains, at the input of a switching circuit 9 which in turn produces at the output a pulse (PAP) (step by step) indicative of a poor phase.

The circuit 8 also furnishes in part, when the phase is poor, a non-zero signal N, N=0 meaning that the signals are in phase, which is applied to the input of a comparison circuit 5 which also receives the signal $Ir_i$ for demanding switching of channel i. The signal N indicates the state which switching is in: if N=1, the channel i is in normal transmission, if N=0, the backup channel x is in operation. When $Tr_i$ and N are not in the same state, the comparison circuit 5 furnishes a signal REC (search) allowing the search for the correct position of the phase of the backup channel. This signal REC is applied to the input of the time counter 7 and serves to initialize it. FIG. 1 shows that the programmable non-coincidence counter 6 counts the pulses NoCo between two pulses INIT furnished by this time counter 7 and that if it arrives at its maximum count q before the arrival of INIT, it emits an absence of correlation pulse ABSCORR at its output, meaning that the data are not in a good phase relation. This signal ABSCORR, also applied to the input of the switching circuit 9, also enables a pulse PAP to be delivered at the output.

Figure 6:
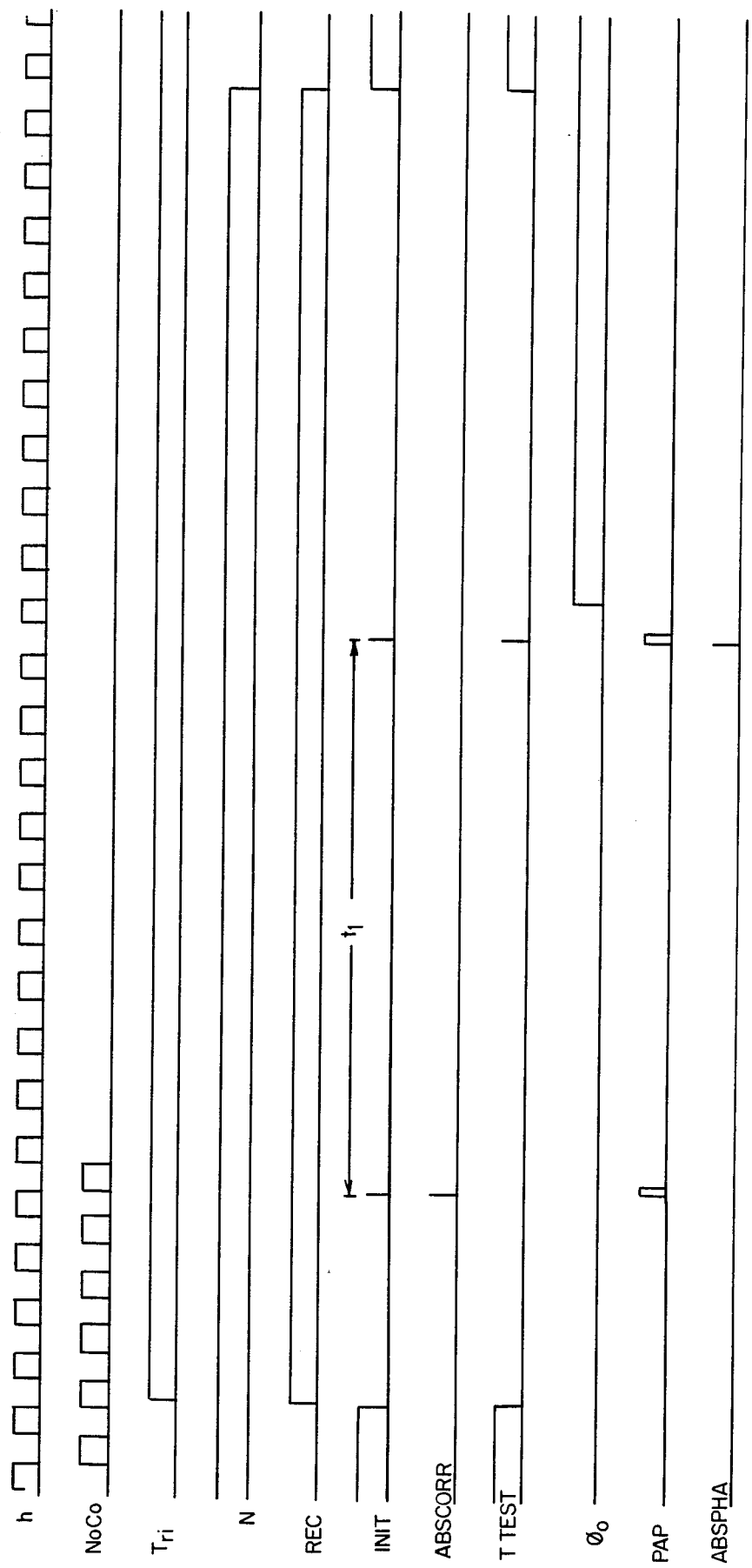
FIG. 6 is a timing chart relative to the circuit of FIG. 5.

The signal ABSCORR initializes the time counter 7. If, after a time $t_1$, there has not been any other pulse ABSCORR, a pulse TTEST is applied by this counter 7 to the input of the circuit 8. This circuit 8 may, depending on the state of $\phi_o$ furnished by the clock discriminator 11, then release a pulse PAP at the output of the circuit 9 by applying thereto a pulse ABSPHA indicative of a poor phase (cf. FIG. 6).

Thus, the correlator 10 of the invention makes it possible to test very quickly, operating at rate $H_i$, the phase relation and often the poor phase relation between the two digital trains, without waiting for the slower phase discriminator 11 to give its result. The choice of q pulses enabling PAP to be delivered is such that there is protection from the possible errors on the data as well as the jitter. The minimum data testing time on one position is therefore pqiu, iu being equal to the period of the signal $H_i$.

Inversely, a good result on the data may further be confirmed by a phase test $\phi_o$ at the end of time $t_1$. The testing times $t_1$ are contiguous and are chosen to be of duration compatible with the technologies of devices 10, 11 and 12.

Figure 7:
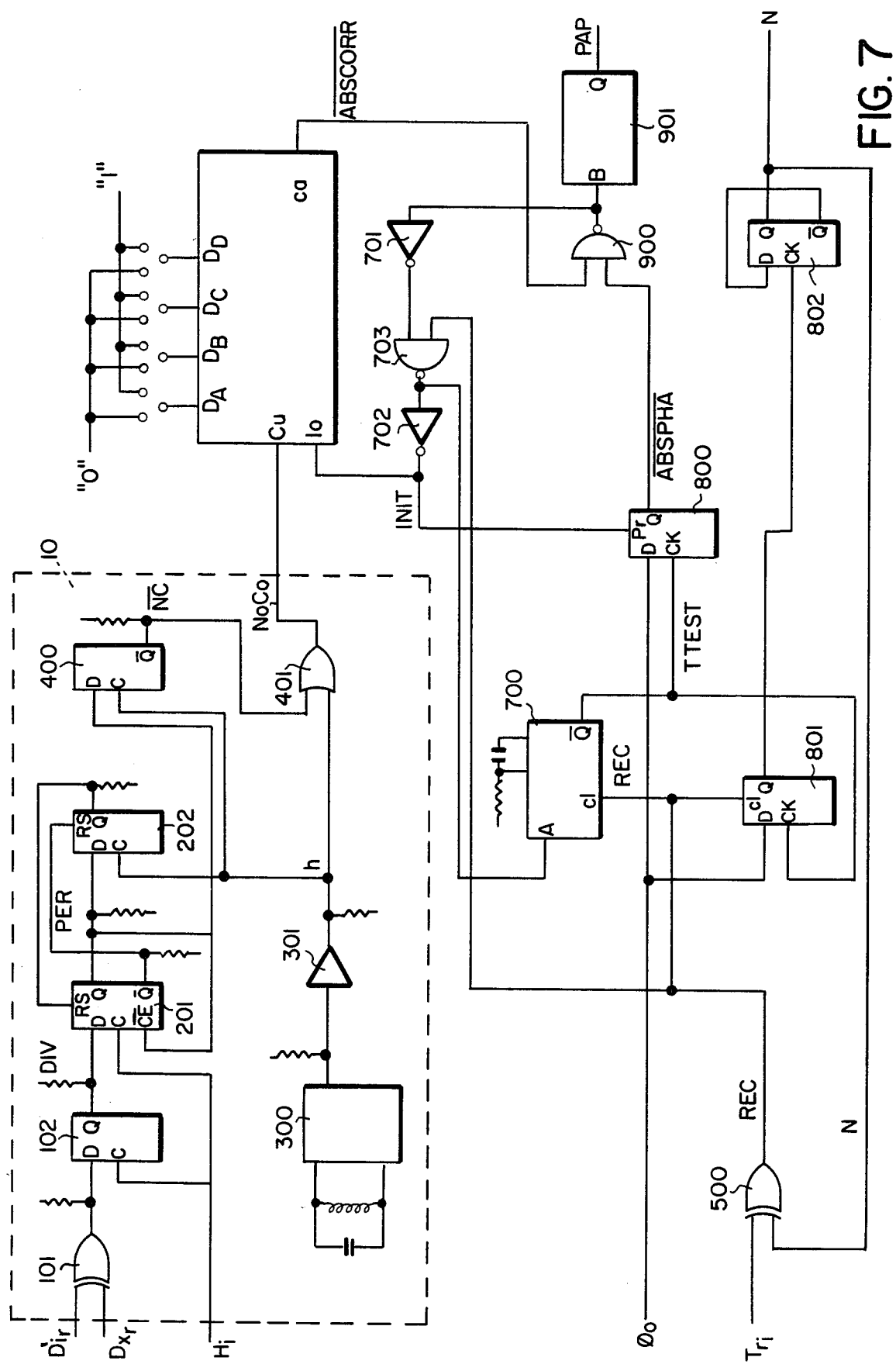
FIG. 7 is a preferred embodiment of the circuit of FIG. 5.

FIG. 7 illustrates a preferred embodiment of the invention.

The correlation device 10 comprises a comparison circuit 1 furnishing the signal DIV. This comparison circuit 1 comprises an "exclusive OR" gate 101, receiving $D'_{ir}$ and $D_{xr}$, a flip flop 102 of which one input D is connected to the output of the gate 101 and of which the other input C is connected to the clock $H_i$. The signal DIV is available on the output Q of the flip flop 102.

The memorization circuit 2 of FIG. 5 comprises flips flops 201 and 202. The flip flop 201 receives the signals DIV on an input D, and $H_i$ on its clock input C. The signal PER is available on its output Q. The output Q is connected to the input $\overline{CE}$ (inverse of "clock enable") of the same flip flop, ensuring blocking of the flip flop 201 in the "1" state.

The flip flop 202 receives the signal PER on its input D and the signal h, indicative of a packet, on its clock input C. Its output Q is connected to the "reset" input of the flip flop 201. Its "reset" input is connected to the output $\overline{Q}$ of the flip flop 201. This interconnection guarantees that, $H_i$ and h being independent, PER is returned to zero with the rising edge of the signal h, whilst allowing the flip flop 400 the time to memorize the information PER.

The oscillator 3 of FIG. 5 comprises a conventional circuit 300 of oscillator LC (capacitor, inductance) of which the output is connected ot the input of a separator circuit 301. The signal h is available at the output thereof.

The memorization circuit 4 of FIG. 5 comprises a flip flop 400 and an OR gate 401. The flip flop 400 receives on its input D the signal PER issuing from the flip flop 201 and h on its clock input C. Its output $\overline{Q}$ furnishes the signal $\overline{NC}$ to gate 401 whose other input receives the signal h. This "OR" gate 401 furnishes at its output the signal $\overline{NoCo}$ which also defines the rapid part 10 of the correlator.

The slow part 12 of this correlator is composed of a programmable counter 6 comprising a circuit 600 which counts the pulses $\overline{NoCo}$ received on its "count up" input. Its "load" input receives the signal INIT which initializes it at a value depending on the wiring of the inputs $D_A$, $D_B$, $D_C$ and $D_D$. The pulse ABSCORR, available on the "carry" output of this circuit 600, indicates that the counter has come to the end of its counting.

The comparison circuit 5 of FIG. 5 comprises an "exclusive OR" gate 500 receiving on its inputs the signals $TR_i$ and N and furnishing the signal REC at the output.

The time counter 7 of FIG. 5 comprises a monostable multivibrator 700, inverters 701 and 702 and an AND gate 703.

The monostable multivibrator 700 is triggered off by the signal REC arriving at is "clear" input. The signal TTEST is available at its output $\overline{Q}$. The inverter 701 receives the output signal from an AND gate 900, evoked hereinafter, and furnishes, at the output, its inverse to the input of the AND gate 703. The other input of this gate 703 receives the signal REC.

The output of the gate 703 is connected to the input A of the monostable multivibrator 700 which it reinitializes and to the input of the inverter 702 whose output furnishes the signal INIT. This signal INIT is applied on the one hand to the "load" input of the programmable counter 600 enabling the latter to be loaded and to the "preset" input of a flip flop 800 described hereinafter.

The decision circuit 8 of FIG. 5 comprises flip flops 800, 801 and 802. The flip flops 800 and 801 both receive on the one hand the phase shift $\phi_o$ furnished by the discriminator 11 on their inputs D and on the other hand the signal TTEST coming from the output $\overline{Q}$ of the monostable multivibrator 700 on their clock input CK. The flip flop 800 is initialized at 1 by the signal INIT arriving on its "preset" input. The flip flop 801 is initialized at 0 by the signal REC arriving on its "clear"

input. The signal $\overline{ABSPHA}$ is available on the output Q of the flip flop 800 whilst the output Q of the flip flop 801 is connected to the clock input CK of the flip flop 802. The latter is mounted as a divider-by-two by the link between its output $\overline{Q}$ and its input D.

The signal N is available on the output Q of this flip flop 802 as well as at the input of the "exclusive OR" gate 500 receiving the signal $TR_i$ on its other input.

The switching circuit 9 of FIG. 5 comprises the gate 900 and a monostable multivibrator 901. The AND gate 900 has one input connected to the "carry" output of the counter 600 and the other input connected to the output of the flip flop 800 thus respectively receiving $\overline{ABSCORR}$ and $\overline{ABSPHA}$. The output of the gate 900 furnishes a positive pulse each time $\overline{ABSCORR}$ or $\overline{ABSPHA}$ passes to zero.

This output of the gate 900 is connected to the input B of the monostable multivibrator 901 which furnishes on its output Q the signal PAP, wide pulse for each pulse sent on its input.

Figure 8:
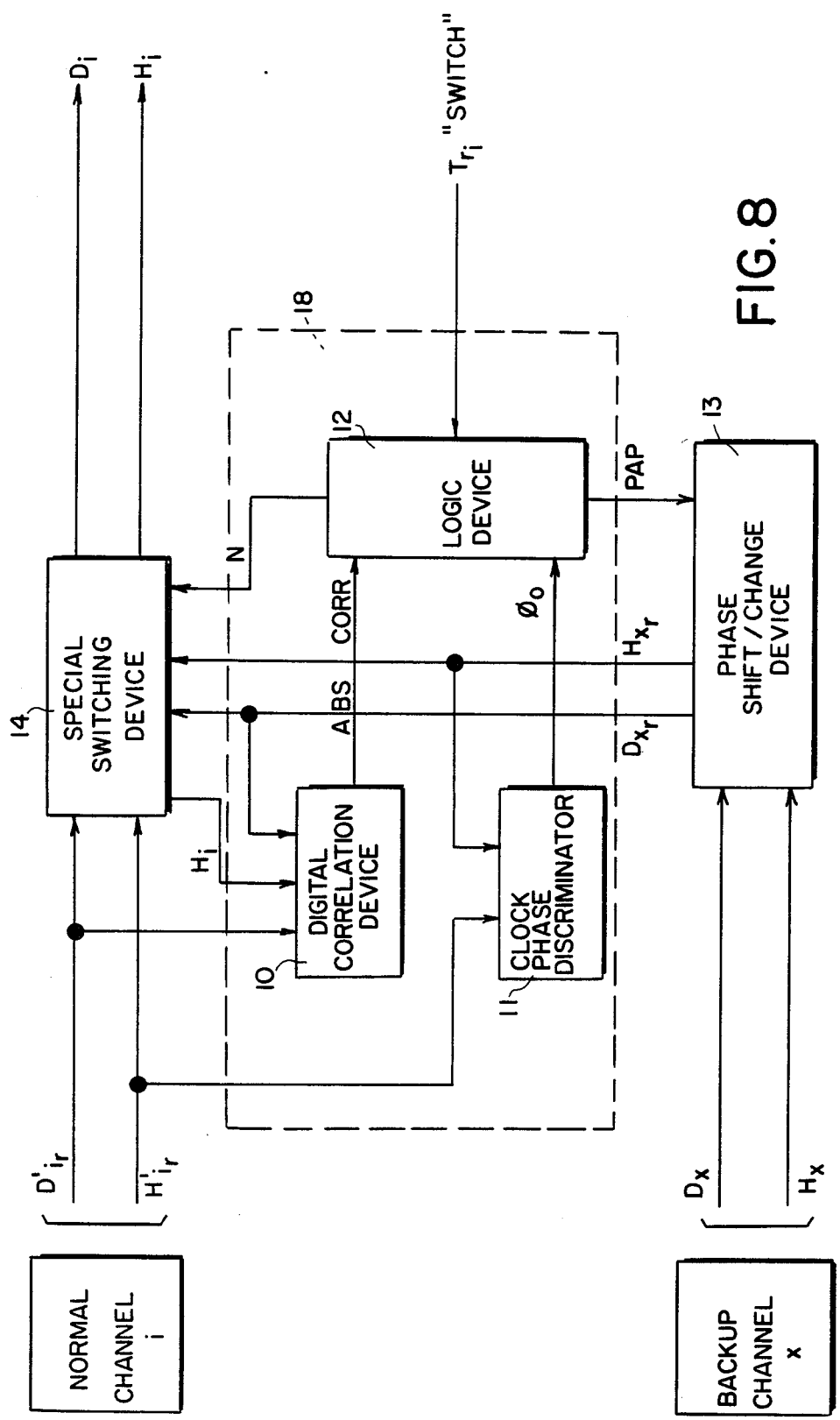
FIG. 8 is a diagram illustrating the application of the device of FIGS. 1 to 7 to the switching of digital trains $D'_{ir} + H'_{ir}$ and $D_x + H_x$.
Figure 16:
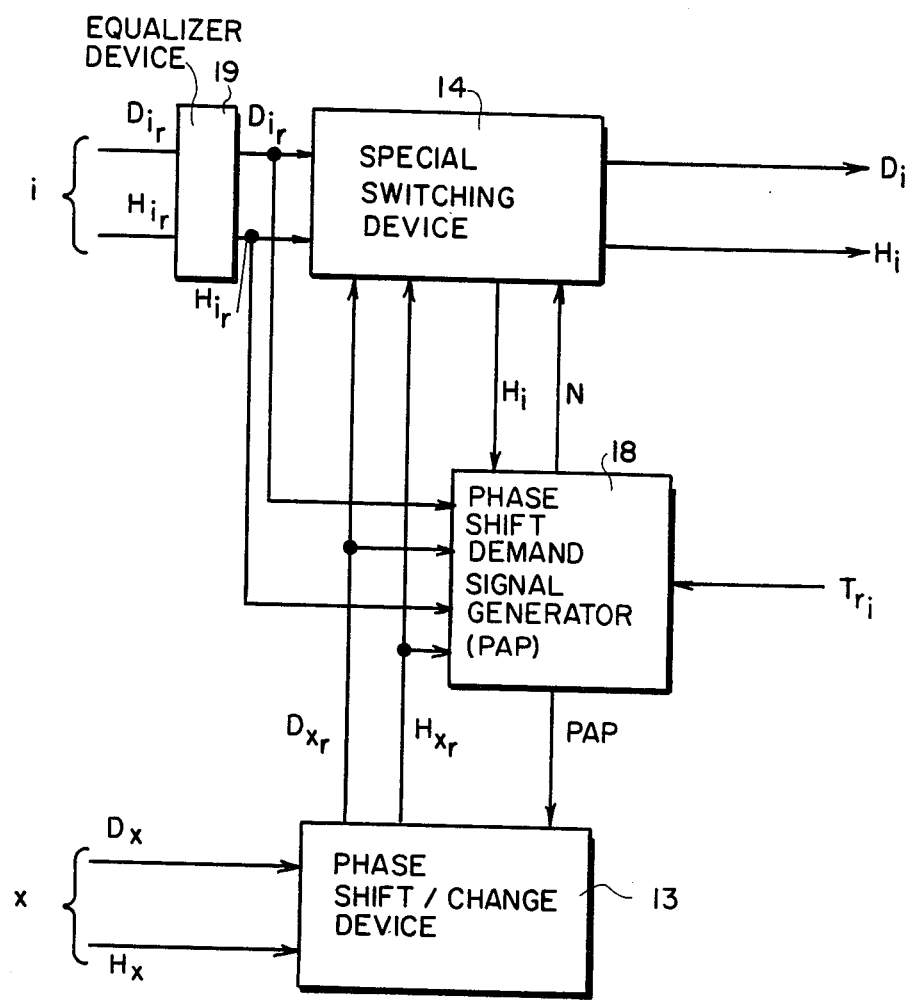
FIG. 16 illustrates the use of the variable phase shift device of the invention applied to the switching of identical digital trains.

FIG. 8 illustrates the application of the device according to the invention for phasing digital trains, to the demand for switching of said trains. A demand for switching arrives, via its order channel $TR_i$, at the level of the logic device 12, for the channel i formed by the data train $D_{ir}+H_{ir}$ and its associated clock signal. This train i is received by means of an equalizer device 19 which furnishes at the output a data train $D'_{ir}$ associated with a clock signal $H'_{ir}$ (FIG. 16). Simultaneously, the backup channel x is received by means of a device 13 and adopts the phase of these signals $D_x+H_x$ as a function of the signal PAP, to furnish to the input of the devices 10, 11 and 14 a digital train $D_{xr}+H_{xr}$ presenting a correct phase relation with the train i demanding to be backed up. The device 14 is advantageously a switching device such as the one described in French Patent Application No. 79 18479. This device 14 receives the switch demand signal N furnished by the logic device 12 allowing the switching demand only when the results furnished by the devices 10 and 11 are satisfactory. This device 14 also furnishes the rate of operation $H_i$ to the device 10 which is the rate of the digital train after switching. The devices 10, 11 and 12 have been described previously. The device 10 makes it possible to test the signals $D_{xr}$ and $D'_{ir}$ whilst the phases $H'_{ir}$ and $H_{xr}$ are compared by means of the discriminator 11. This makes it possible to obtain, at the output of the logic decision device 12, the signal PAP, wide pulse, indicative of a poor phase at the input of the phase change device 13 of the backup channel $D_{xr}+H_{xr}$.

Figure 9:
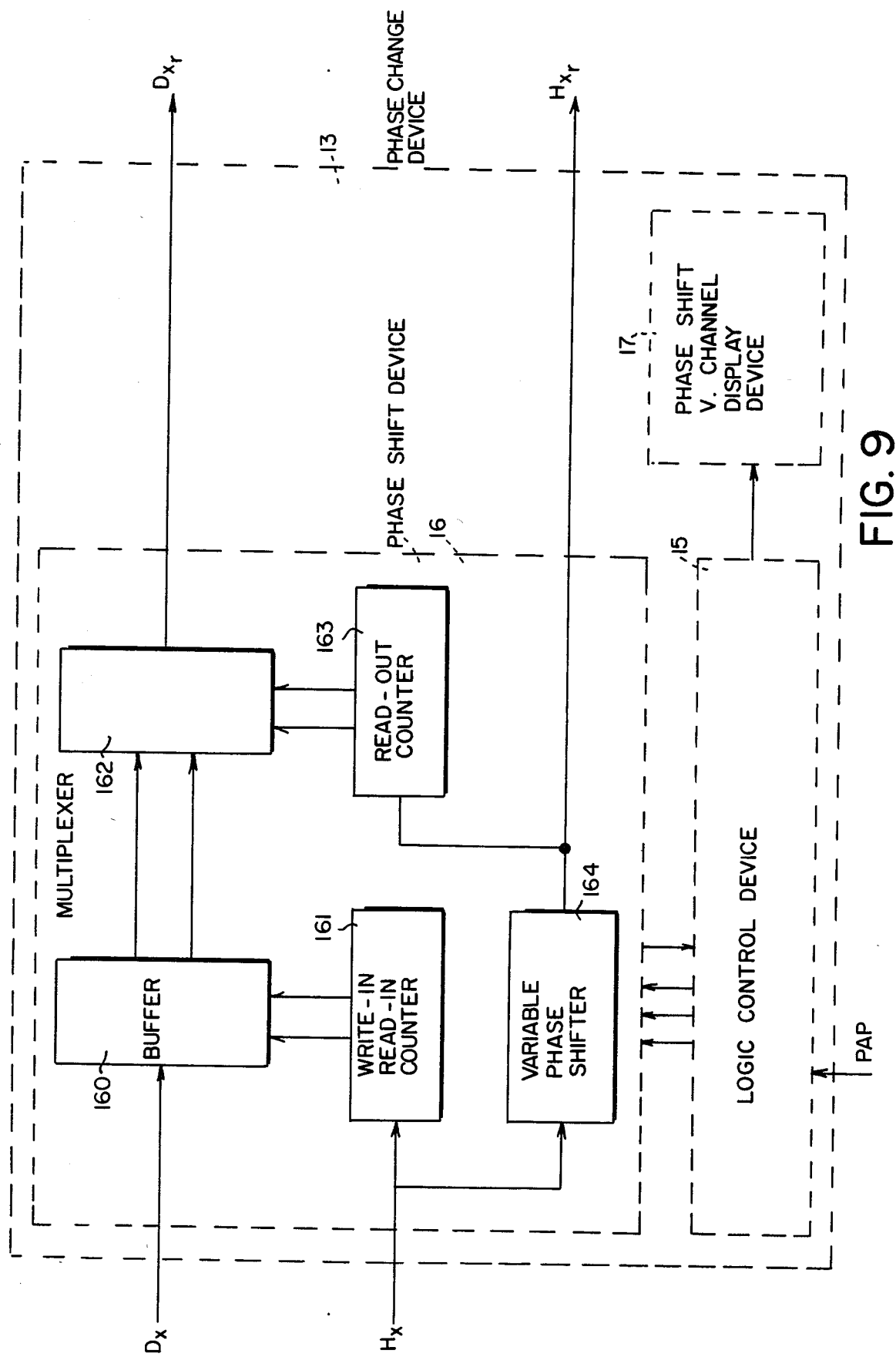
FIG. 9 is a block diagram of the phase variation device according to the invention.

Referring to FIG. 9, the phase change device 13 comprises a logic control device 15 receiving a phase modification demand order PAP and an actual phase modification device 16, receiving the entering digital train $H_x+D_x$ and furnishing at the output a phase-shifted output digital train $D_{xr}+H_{xr}$ further to an order furnished by the control device 15. Moreover, the device 13 comprises a device 17 for displaying said phase shift as a function of the channel i in question. The phase shift device 16 according to the invention, illustrated in FIG. 9, comprises a buffer 160, inscribing in parallel the data $D_x$ issuing from the backup channel at the rate of a write-in counter 161, which receives the signal $H_x$ from this same backup channel. The variable phase shifter 164 according to the invention envisages varying the clock of a read-out counter 163 with respect to the clock $H_x$ of the read-in counter 161 by a magnitude furnished by this variable phase shifter 164. The data stored in the memory 160 has read and multiplexed in a multiplexer 162 at the rate furnished by the read-out counter 163, said multiplexer 162 furnishing at the output a digital data train $D_{xr}$.

Figure 10:
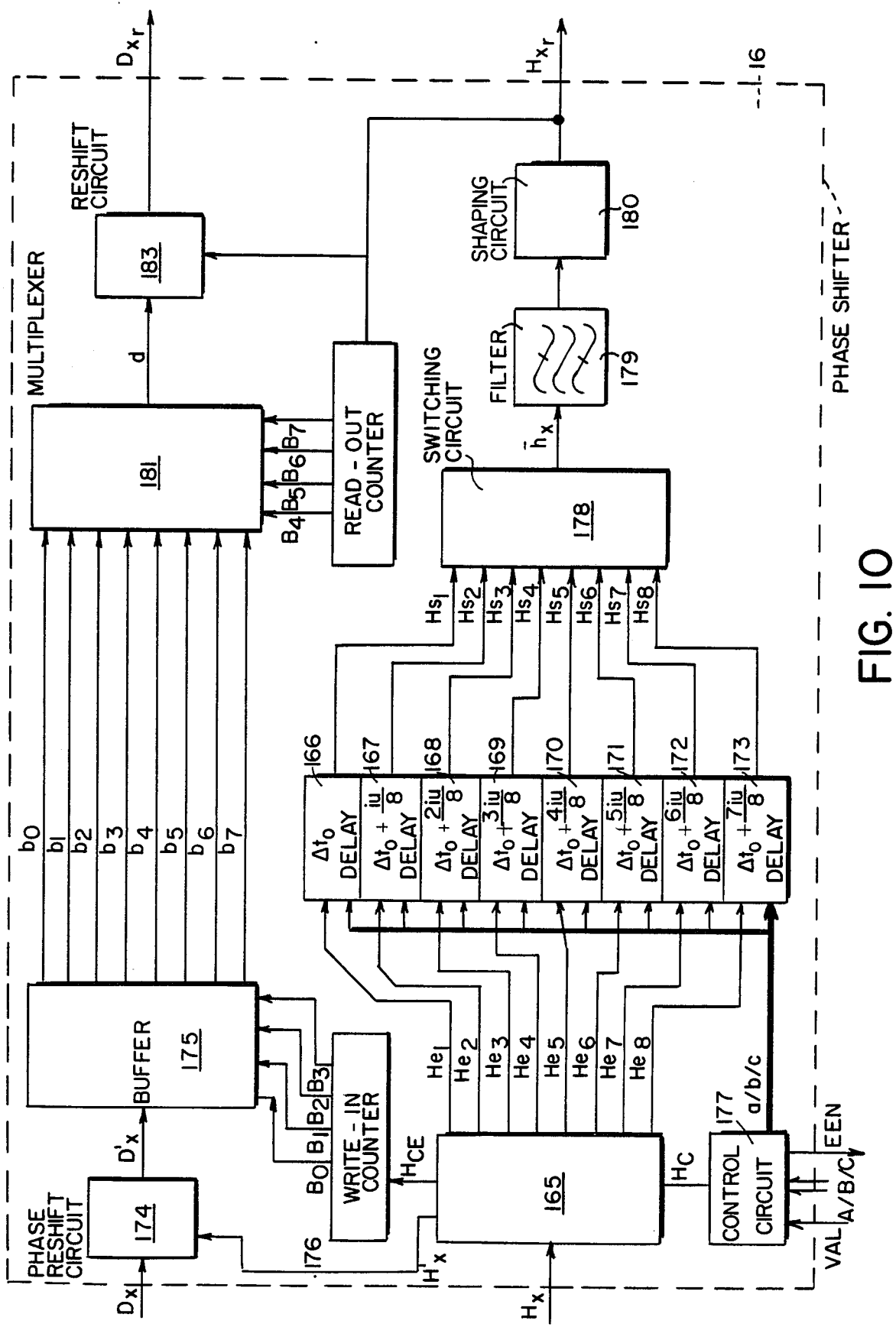
FIG. 10 is a detailed diagram of the actual phase variation device of FIG. 9.

FIG. 10 shows a preferred embodiment of the variable phase shifter according to the invention.

The purpose of the variable phase shifter 164 according to the invention is to procure a variation which is no longer continuous as in the known techniques, but discrete in a predetermined range. To this end, P switchable phase shifters covering a periode in P discrete values make it possible, in response to a phase change demand PAP, to correct the shift of the clocks. The stop P corresponding to a phase jump of 1/p iu is a magnitude chosen so that it is compatible with the jitter tolerable by the downstream equipment, iu being a time slot equal to one period. This phase jump may be effected on the backup channel in service.

In the embodiment of FIG. 10, P has been chosen to be equal to 8. In fact, this is a magnitude suitable for use of the logic circuits, as $8=2^3$; in addition, this value of P makes it possible not to multiply the organs too much and to have a sufficiently fine stop.

The phase shifter 16 according to the invention makes it possible to vary the phase by as many periods as is desired, the output digital train $D_{xr}$ being capable of varying within a range of n bits.

The phase shifter 16 according to the invention ensures for the backup digital train a delay variable in jumps, in one direction or in the other, the phase shift being passed through in both directions up to stops changing direction of scanning at the ends of the range.

The phase shifting 164 according to the invention is left at the last position controlled by the last switching.

Referring to FIG. 10, the clock signal $H_x$ arriving from backup channel x is applied to the input of a time distributor circuit 165 which furnishes the clock $H_x$ at the 8 different outputs $He_1$, $He_2$, $He_3$, $He_4$, $He_5$, $He_6$, $He_7$, $He_8$ with the same phase. These clock signals are applied to the input of eight circuits 166 to 173 respectively furnishing at the output a clock delayed by a corresponding quantity of time $\Delta t$.

Circuit 166 delays by $\Delta t = \Delta t_o$.

Circuit 167 delays by $\Delta t = \Delta t_o + \frac{iu}{8}$.

Circuit 168 delays by $\Delta t = \Delta t_o + \frac{2iu}{8}$.

Circuit 173 delays by $\Delta t = \Delta t_o + \frac{7iu}{8}$.

Therefore 8 delays shifted by iu/8 are furnished, iu being equal to a clock period $H_{ir}$.

A signal $H'_x$ deducted from $H_x$ by an appropriate phase is furnished by the circuit 165 and applied to the input of a phase reshift circuit 174 of the input train $D_x$. This circuit 174 furnishes a train $D'_x$ at the output which is applied to the input of a buffer 175. A write-in counter 176 receives the signal $H_{CE}$ which serves as write-in clock signal therefor. $H_{CE}$ is deducted from $H_x$ by the circuit 165 with an appropriate phase.

The counter 176 is of the synchronous Johnson type, corresponding to a conventional solution for the write-in of the data $D'_x$ in the memory 175 to be effected without risks of ambiguity. The counter 176 produces 8 synchronous signals $B_0$, $B_1$, $B_2$, $B_3$ and their logic complements which furnish eight signals for recording the data in the memory 175.

A control circuit 177 memorizes the control signals A B C furnished by the logic control device 15, to which reference will be made later, at the rate of the clock $H_C$ furnished by the circuit 165 from $H_x$, each time the signals A, B, C are enabled by a signal VAL also furnished by the logic device 15. The circuit 177 produces a signal EEN (execution recording), which indicates that these orders have been recorded likewise whose destination is device 15.

At the output, the circuit 177 also produces signals a, b, c whose destination is eight phase shift circuits 166 to 173. These eight circuits 166 to 173 are inhibited by the state of abc, so that only one is active at a time. The signals a, b, c are deducted from the order ABC by enabling of VAL. This code may for example be that illustrated in FIG. 11. The letters a, b and c represent eight different positions of the phase shifts rendering one circuit 166 to 173 only active, for which a, b, c represent 1 or 0. The code a b c is a cyclic code such that the passage from one circuit to an adjacent circuit is effected without parasite at the output. Of the eight clocks 166 to 173, only one delivers an output signal. The other seven are in a fixed state. The signals a, b, c change synchronously when the circuit 166 to 173, momentarily active, is in its rest state, which makes it possible not to add nor subtract any clock edge. It is this which fixes the phase of the clock $H_c$ synchronizing the circuit 177. According to the configuration thus described, there is a jump only of $\frac{1}{8}$iu at each new order a b c. The outputs of the circuits 166 to 173 furnish the signals $\overline{H}s_1$, $\overline{H}s_2$, ... $\overline{H}s_8$ respectively are connected to the 8 inputs of a switching circuit 178. At the output of the circuit 178, only the input clock signal $\overline{h}_x$ which is active is available. The delays thus brought to the eight input signals must be identical in order not to create parasites during switchings of delays. The signal $\overline{h}_x$ leaving the circuit 178 passes through a pass band filter 179 with narrow band centred on the nominal frequency of $H_x$. This filter 179 makes it possible to convert the jump of phase iu/8, inevitable upon each change of delay, into miu/8 (or miu/P in the general case), m being an integer between 0 and 7, a phase shift spread out over more than ten bits being much too easy to accept for the downstream equipment. Moreover, it guarantees that the phase jump does not cause any clock edge to appear nor to disappear.

The output of the filter 179 is connected to a shaping circuit 180 which delivers at the output a signal $H_{xr}$ whose shape is compatible with the technology used.

The eight bits $b_0$, $b_1$ ... $b_8$ stored in the buffer 175 are received by a multiplexer 181 timed by a read-out counter 182. The read-out counter 182 has for clock the clock signal $H_{xr}$ furnished at the output of the shaping circuit 180. This read-out counter 182 is advantageously of the synchronous Johnson type. It leads to simple logic circuits, with short propagation times and allows correct operation for the high rates. The four output signals of this counter 182, designated by $B_4$, $B_5$, $B_6$, $B_7$, control the multiplexer 181. At the output, the multiplexer 181 furnishes a signal d which is a reconstitution of the data signal $D_x$ delayed in phase by the chosen time $\Delta t$.

A reshift circuit 183 re phase-shifts the signal d with the clock $H_{xr}$ issuing from the circuit 180 and furnishes at the output the data signal $D_{xr}$.

Figure 12:
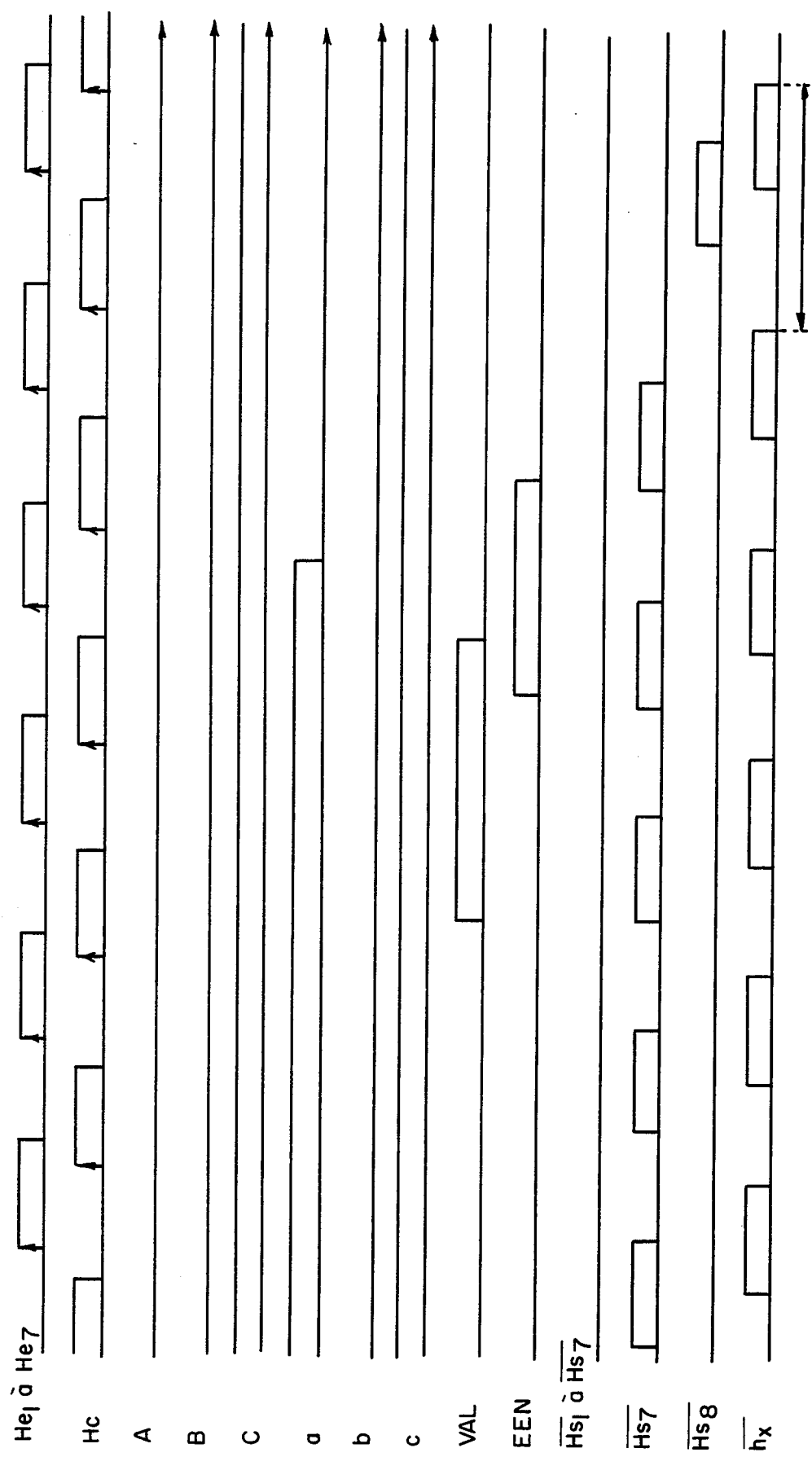
FIG. 12 is a timing chart of variable phase shift during a change of phase shift.

The timing chart of FIG. 12 illustrates the functioning of the phase change device according to the invention of FIG. 10. Initially, it is the circuit 172 which is the only one not to be blocked. The signals ABC give the code of the state 001 whilst a, b, c are at state 101. An enabling VAL occurs, producing EEN which must flank a plateau of one of the clocks $He_1$ to $He_8$ issuing from the circuit 161 by using the adjustment provided in the circuit 177. The signals a, b, c are then modified according to A B C provoking blocking of the phase shift circuit 172 whilst the clock H is in the same state as th former state a, b, c̄. Arrows indicate in the chart of FIG. 12 how the instants corresponding to the various edges of the clock and to the switching of a, propagate towards $\overline{H}s_7$ and $\overline{H}s_8$. The extended period of $\overline{h}_x$ is also shown.

Figure 13:
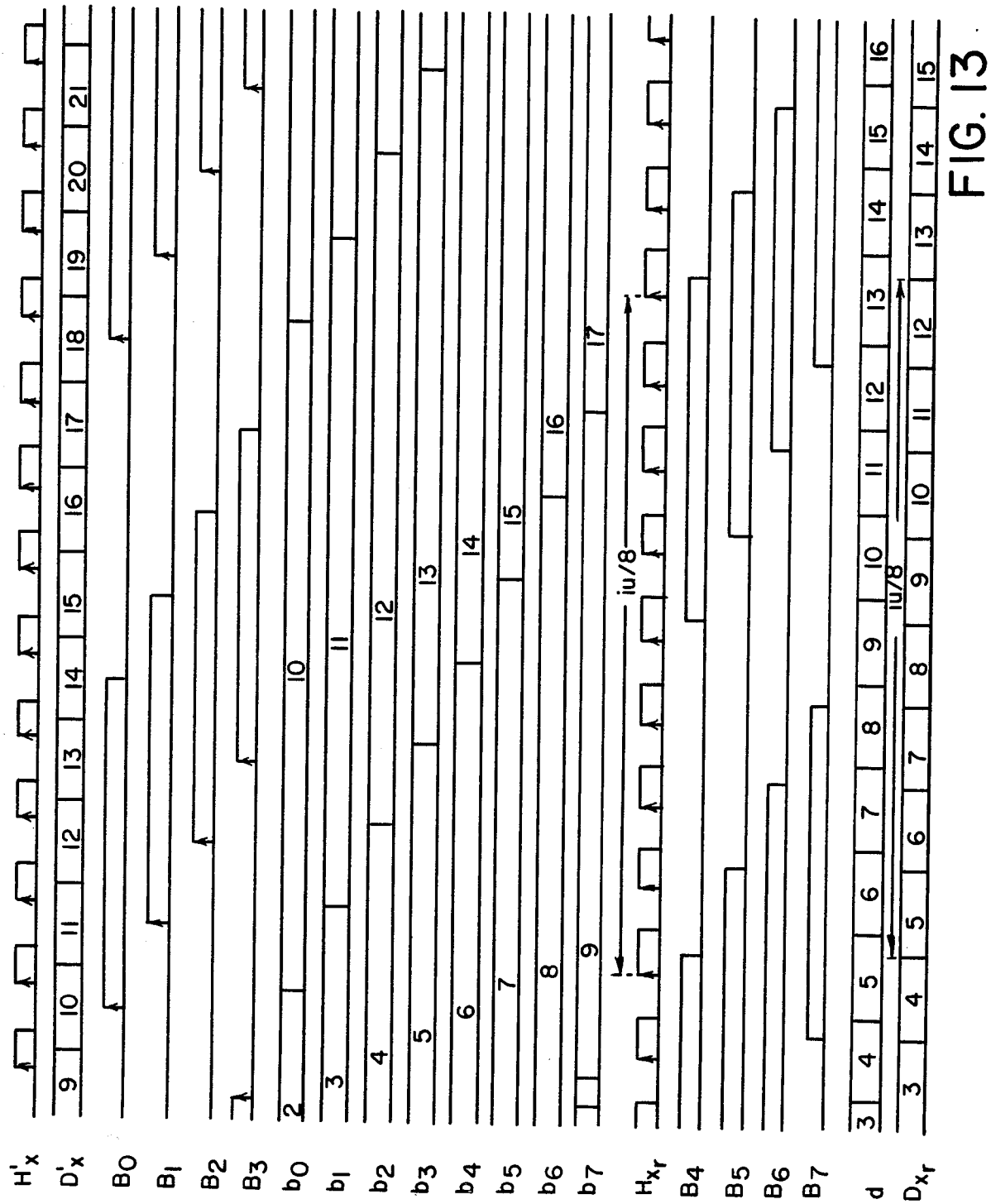
FIG. 13 is a timing chart of the buffer in the cases of delay change of the variable phase shift.

The functioning of the buffer 175 is illustrated in FIG. 13 in the case of a phase jump of iu/8. The delay brought by the buffer 175 extends approximately up to the centre of the possible range, after the second rising edge of the clock signal $H_{xr}$. The edges of the clock signals $B_0$, $B_1$, $B_2$ and $B_3$ furnished by the write-in counter 176 decompose the data signal $D'_x$ into eight signals $b_0$, $b_1$ ... $b_7$ written in the buffer 175. The read-out counter 182 for its part furnishes signals $B_4$, $B_5$, $B_6$, $B_7$ making it possible to read the signals $b_0$, $b_1$ ... $b_7$ according to the clock $H_{xr}$ having undergone a phase shift of iu/8 spread over a few periods. The outputs $B_4$, $B_5$, $B_6$, $B_7$ of the read-out counter 182 have undergone a phase shift of with the clock signal $H_{xr}$. The data train d reconstituted by the multiplexer 181 has also shifted and after re-read out by the clock signal $H_{xr}$ by means of the shift device 183, the data train $D_{xr}$ of the backup channel is identical to the train $D'_x$ but has undergone a phase delay of iu/8.

Figures 1, 14:
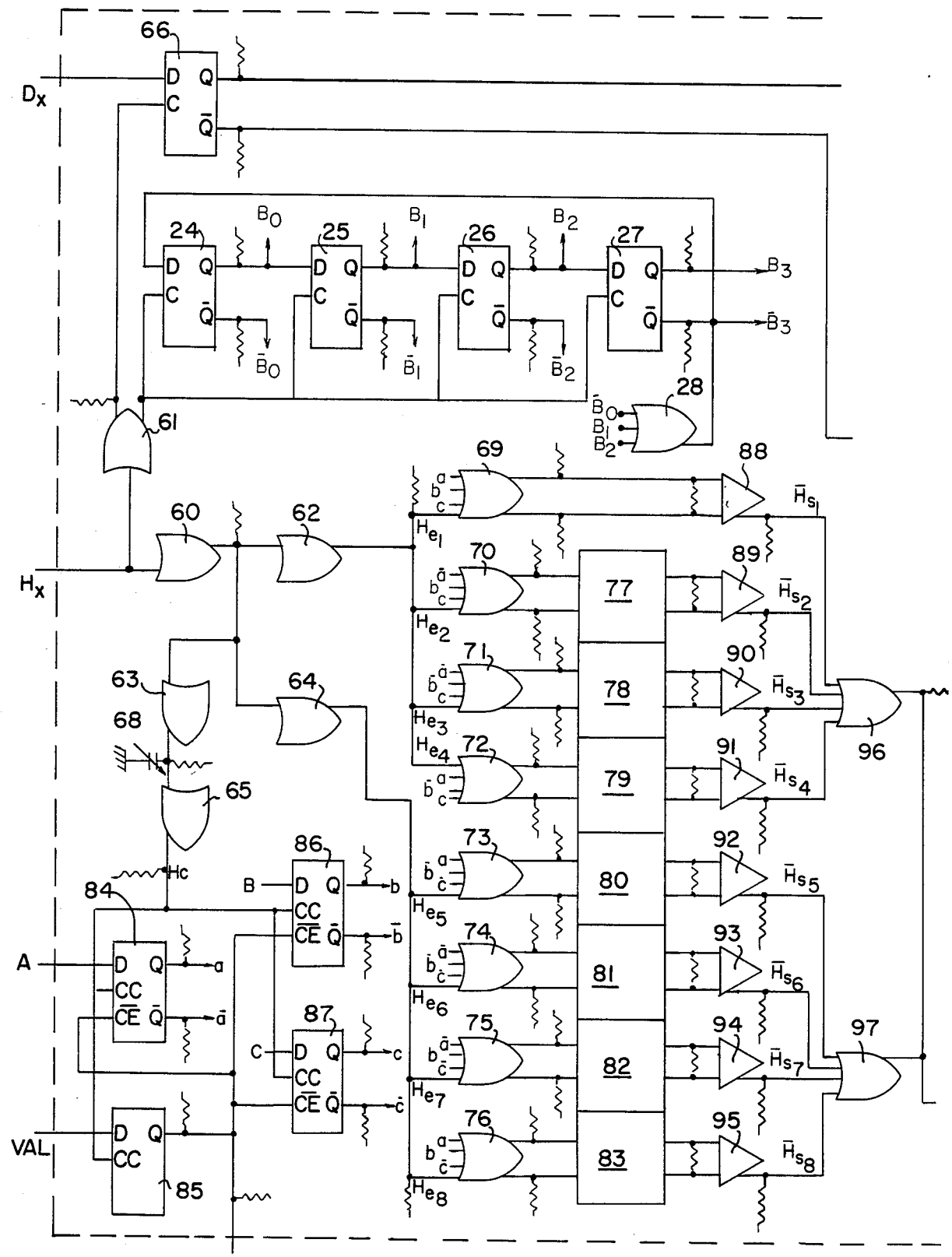
FIG. 14 is a preferred embodiment of the device of FIG. 10.
Figures 2, 14:
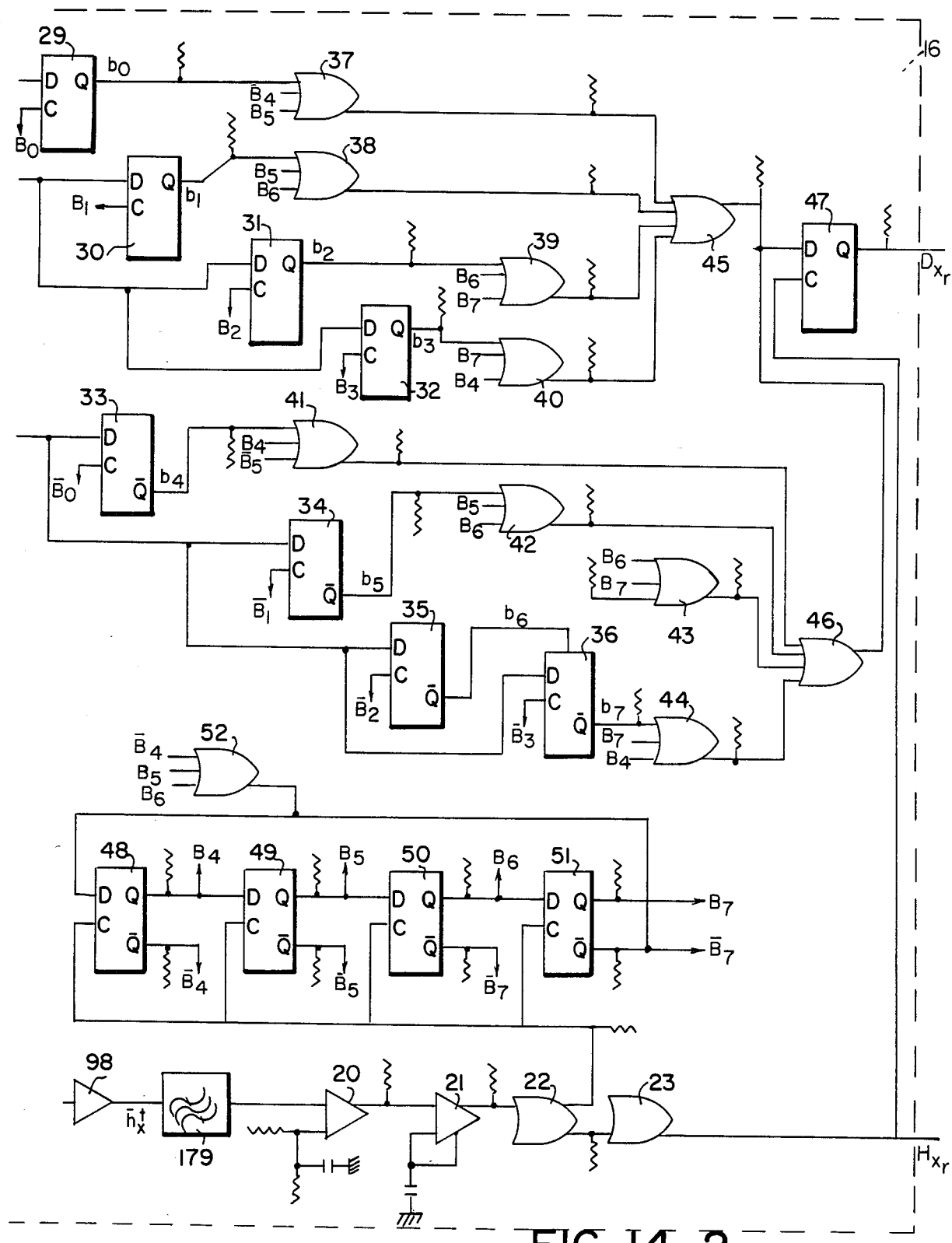

An embodiment is shown with reference to FIG. 14. The clock distribution circuit, designated by reference 165 in FIG. 10, comprises six gates 60, 61, 62, 63, 64, 65 mounted as separators. The input signal $H_x$ arrives on the gates 60 and 61. The direct and inverse outputs of the gate 61 furnished clocks to the write-in counter circuit 24 and to the re-shift circuit 66 respectively. The output of the gate 60 is connected to the input of the gate 63. The signal $H_c$ obtained after having passed through the gates 63 and 65 presents a delay adjusted by a capacitor 68 connected to the output of the gate 63. The output of the gate 60 also furnishes a clock signal to the gates 62 to 64 of which the outputs are connected to the delay circuits of the variable phase shifter 164 of FIG. 9. This variable phase shifter 164 comprises eight delay circuits 166 to 173 according to FIG. 10, thus receiving eight clock signals $He_1$ to $He_8$ fixed in phase.

The logic circuit 177 of FIG. 10 comprises four flip flops 84, 85, 86, 87. The signal $H_c$ issuing from the gate 65 is connected to the "common clock" inputs of these four flip flops. On the input D of the flip flop 85 an enabling signal VAL arrives, furnished by the control device 15 which will be explained hereinafter; on its output Q, the signal EEN is available. This signal EEN is transmitted to the control device 15 and is applied to the clock enable inputs of the flip flops 84, 86, 87. On the inputs D of these three flip flops 84, 86, 87 arrive the signals A/B/C respectively furnished by the same control device 15; these three flip flops 84, 86, 87 respectively furnish on their output Q the signals a, b, c and on their output $\overline{Q}$ the signals ā, b̄, c̄. These latter three flip flops thus ensure synchronization of the signals A, B, C on the clock $H_c$ and therefore on input $H_x$. The different phase shift circuits 166 to 173 of FIG. 10 receive on the one hand the signals He$_1$ to He$_8$ respectively, on the other hand the control signals a, b, c or their complement furnished by the device 177.

The circuit 166 of FIG. 10 comprises an emitter OR gate 69 and a receiver gate 88. The emitter gate 69 receives the control signals a, b, c, as well as He$_1$. The receiving gate 88 furnishes at the output the clock signal Hs$_1$. The emitter OR gate 70, receiving the signals a, b, c, forms with the receiving gate 89 and a delay line 77, separating the gates 70 and 89, the phase shifter circuit 167 of FIG. 10. The delay line 77 ensures a delay of $\frac{1}{8}$ iu for the signal Hs$_2$ with respect to signal $\overline{\text{Hs}}_1$. The same applies to the phase shifter 168 of FIG. 10, comprising OR gates 71, a delay line 78 and a gate 90 furnishing $\overline{\text{Hs}}_3$. The OR gate 71 receives the signals $\bar{a}$, $\bar{b}$, c whilst the delay line 78 delays by 2/8 iu and the gate 90 furnishes the signal $\overline{\text{Hs}}_3$. For the circuit 169, the signals a, $\bar{b}$, c and the clock signal He$_4$ are received by an OR gate 72 then delayed by a delay line 79 by 3iu/8 then applied to the input of a gate 91 which furnishes the signal Hs$_4$ at the output.

In the same way, the circuit 170 comprises an OR gate 73, a delay line 80 applying a delay equal to 4iu/8 and a gate 92 which furnishes the signal $\overline{\text{Hs}}_5$ at the output. The circuit 171 then comprises an OR gate 74, a delay line 81 applying the delay equal to 5iu/8 and a gate 93 which furnishes the signal $\overline{\text{Hs}}_6$ at the output.

Then the circuit 172 comprises an OR gate 75, a delay line 82 applying the delay equal to 6iu/8 and a gate 94 which furnishes the signal $\overline{\text{Hs}}_7$ at the output.

Finally, the circuit 173 comprises an OR gate 76, a delay line 83 applying the delay equal to 7iu/8 and a gate 95 which furnishes the signal $\overline{\text{Hs}}_8$ at the output.

The switching circuit 178 of FIG. 10 comprises two OR gates 96 and 97 and a separator 98. The gate 96 receives the signals $\overline{\text{Hs}}_1$ to $\overline{\text{Hs}}_4$ whilst the gate 96 receives the signals $\overline{\text{Hs}}_5$ to $\overline{\text{Hs}}_8$. The outputs of these two gates 96 and 97 are connected as "wired OR" to the input of a separator gate 98 whose output furnishes the signal $\bar{h}_x$. This signal $\bar{h}_x$ is applied to the input of the filter 179. The shaping circuit 180 of FIG. 10, connected to the output of the filter 179, comprises two comparators 20 and 21 mounted in cascade followed by two separator gates 22 and 23. The inverse output of the gate 23 furnishes the output signal H$_{xr}$.

The write-in counter 176 of FIG. 10 comprises four flip flops 24, 25, 26, 27 mounted as a Johnson counter by 8 and an OR gate 28 whose output is connected as a "wired OR" with the output $\overline{Q}$ of the flip flop 27 enabling the prohibited cycle of the counter to be avoided.

On the outputs Q and $\overline{Q}$ of these four flip flops 24, 25, 26, 27, the signals B$_0$, $\overline{B}_0$, B$_1$, $\overline{B}_1$, B$_2$, $\overline{B}_2$, B$_3$ and $\overline{B}_3$ are respectively available; they serve as clock for the flip flops forming the buffer 175 of FIG. 10. Moreover, the signals $\overline{B}_0$, B$_1$ and B$_2$ are connected to the inputs of the OR gate 28. The inverse output of this gate 28 is applied to the input D of the flip flop 24.

The reshift circuit 174 of FIG. 10 comprises a flip flop 66 of type D whose clock is issuing from the inverse output of the gate 61 and whose input D receives the data signal D$_x$.

The buffer circuit 175 of FIG. 10 comprises eight flip flops 29 to 36. The output Q of the flip flop 66 is connected to the inputs D of the four flip flops 29 to 32 which respectively receive for clock the signals B$_0$ to B$_3$ coming from the outputs Q of the flip flops 24 to 27. On the outputs Q of the flip flops 29 to 32 are obtained the signals b$_0$ to b$_3$ already illustrated in FIG. 13. To reduce the load of the output Q of the flip flop 66, its output $\overline{Q}$ is connected to the inputs D of the flip flops 33 to 36 which receive for clocks the signals $\overline{B}_0$ to $\overline{B}_3$ coming from the outputs $\overline{Q}$ of the flip flops 24 to 27. The signals b$_4$ to b$_7$ are available on the outputs $\overline{Q}$ of the flip flops 33 to 36. The multiplexing circuit 181 of FIG. 10 comrpises ten OR gates 37 to 46. One input of each gate 37 to 44 receives the signals b$_0$ to b$_7$ and is connected to the input Q of the flip flops 29 to 32 and $\overline{Q}$ of the flip flops 33 to 36. Two other inputs of these gates are connected to the readout counter marked 182 in FIG. 10. This read-out counter 182 comprises four flip flops 48 to 51 also mounted as a Johnson counter by eight, and an OR gate 52 whose output is connected as a wired OR with the output $\overline{Q}$ of the flip flop 51 in order to avoid the prohibited cycle of the counter. The signals B$_4$, $\overline{B}_4$, B$_5$, $\overline{B}_5$, B$_6$, $\overline{B}_6$, B$_7$, $\overline{B}_7$ respectively are available on the outputs Q and $\overline{Q}$ of the four flip flops 48 to 51. The four flip flops 48 to 51 receive on their clock input the signal available at the direct output of the gate 22. Moreover, the signals $\overline{B}_4$, B$_5$ and B$_6$ are applied to the inputs of the gate 52.

In this way, the gate 37 receives the signals $\overline{B}_4$ and B$_5$, the gate 38 signals $\overline{B}_5$ and B$_6$, the gate 39 the signals $\overline{B}_6$ and B$_7$, the gate 40 signals $\overline{B}_7$ and $\overline{B}_4$. The inverse outputs of these four gates 37 to 40 are connected to the four inputs or the OR gate 45.

The gate 41 receives the signals B$_4$ and $\overline{B}_5$, the gate 42 the signals B$_5$ and $\overline{B}_6$, the gate 43 the signals B$_6$ and $\overline{B}_7$, the gate 44 the signals B$_7$ and B$_4$. The inverse outputs of these four gates 41 to 44 are connected to the input of an OR gate 46. The outputs of the gates 45 and 47 are connected as "wired OR" to the input D of a flip flop 47 of the type D whose "clock" input receives the clock signal H$_{xr}$. A delayed data signal D$_{xr}$ synchronous with the clock signal H$_{xr}$ is available on the output Q of this flip flop 47.

Figure 15:
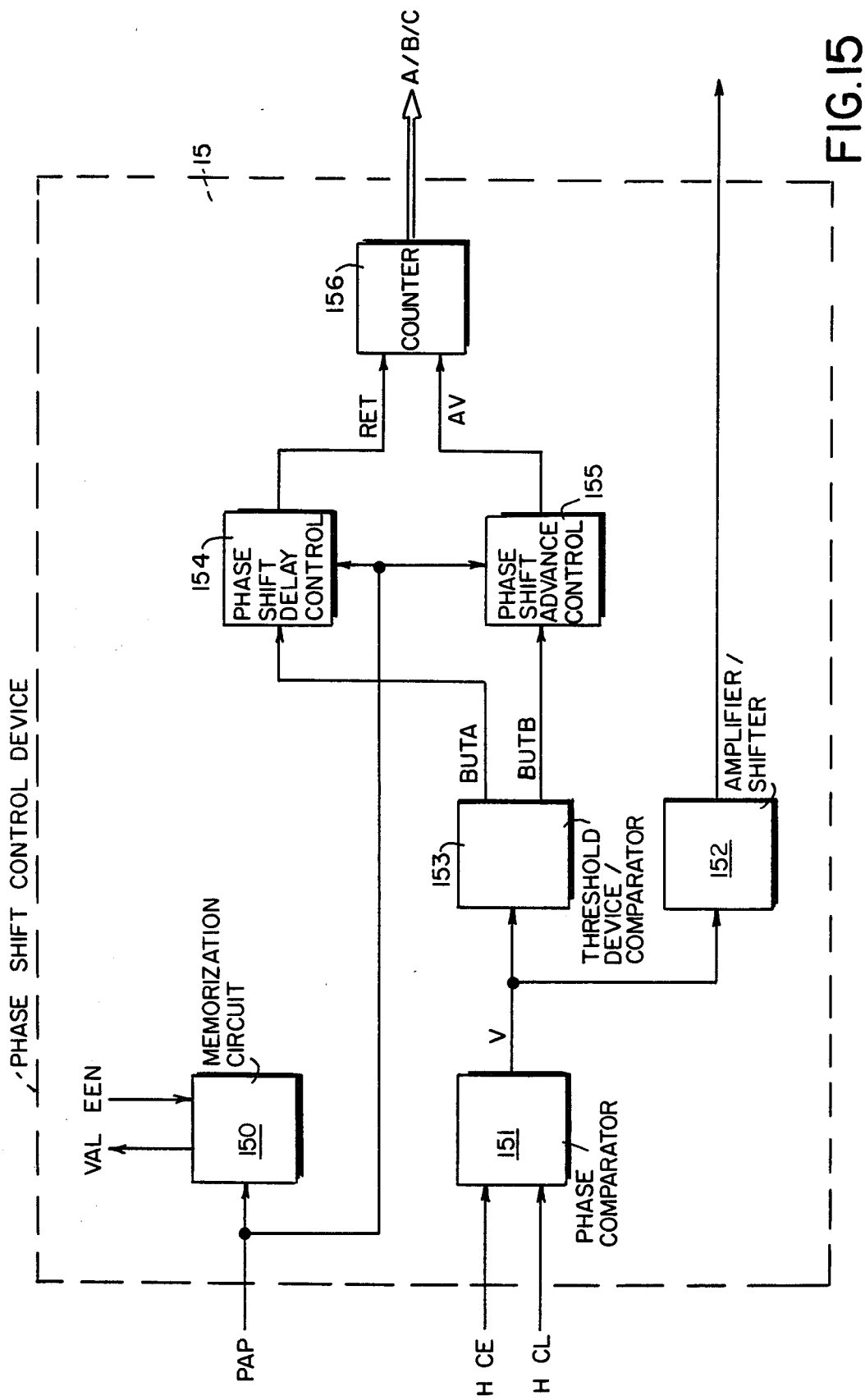
FIG. 15 is a detailed diagram of the control device of FIGS. 10 and 14.

With reference again to FIGS. 9 and 10, the phase shift control device 15 receives a phase change demand signal PAP and furnishes the device 16 with VAL and control A/B/C signals as well as the signal EEN. This device 15, illustrated in FIG. 15, comprises a memorization circuit 150 which furnishes a signal VAL on the rising edge of PAP and which is initialized by the signal EEN furnished by the device 16. The phase comparator 151 compares the phase of two write-in and read-out signals HCE and HCL respectively, already applied respectively to the counters 176 abd 182 of FIG. 10. The comparator 151 furnishes at the output a voltage V such that V is at extreme values when the shilft between the two counters 176 and 182 no longer makes it possible to make a correct read-out or when the limits of the desired range of variation are attained.

The circuit 152 is an amplifier which amplifies and shifts the voltage V to a value "deviation" compatible with the voltages required for a display. This "deviation V" signal is applied to the input of a delay display device 17. This display by application of the deviation V signal allows easy control and adjustment of the equalization of the channel i without interrupting the link. This equalization makes it possible, under normal conditions of propagation, to effect switching at the centre of the variable range of the backup channel, the sign of the variation of the phase shift between the channels being unknown. According to the invention, the device 17 advantageously displays the value m of the phase shift miu/P.

A threshold device 153 also receives the voltage V furnished by the comparator 151 and indicates at the output when V attains the zones corresponding to the incorrect relative positions of the two counters. This comparator 153 furnishes at the ouput two signals BUT A and BUT B which are two stops A and B limiting the phase shift scanning. The stops A and B allow the signal PAP to pass either by the device 154 or by the device 155. The device 154 therefore receives, in addition to signal PAP, the signal BUT A and furnishes at the output a signal RET which will control a delay of the phase shift. On the contary, the device 155 receives, in addition to signal PAP, a signal AV which will control an advance to phase shifting. The passage of RET to AV is effected by passage to the stops. These two signals RET and AV, applied to the input of a counter 156, serve as rising or falling clocks for this counter 156 which furnishes at the output a signal A/B/C whose code has already been described with reference to FIG. 11. It is the rear edge of the signal PAP which is active at the level of the counters 154 and 155, thus preparing the following delay change.

Thus, the discrete sequence of the variable delays miu/P, m being a natural whole number, with $1 \leq m \leq p-1$, may be passed over in one direction then in the other. The stops A and B change the direction of scanning at the ends of the range of variation.

This range of n bits presenting a stop of iu/P may be represented on the display of the display device 17 by means of diodes. The exact delay is read instantaneously due to the "deviation V" signal.

FIG. 16 shows a preferred application of the delay by jump to the switching of digital trains transmitted by radio beams. If $D_{ir} + H_{ir}$ is a digital train conducted by normal channel which must be replaced by the backup channel $D_x + H_x$ following an order $T_{ri}$ transmitted by the order channel, it is firstly applied to the input of an equalization device 19 which furnishes at the output a train $D'_{ir} + H'_{ir}$. The device 18 receives the train $D'_{ir} + H'_{ir}$, tests the phase shift of this train with respect to the train of backup channel x and furnishes a phase shift demand signal PAP to the input of the phase shift device 13. This device 13 furnishes at the output a digital train $D_{xr} + H_{xr}$ phase shifted with respect to its original position. The device 18 already illustrated in FIG. 8 comprises the device 10 for correlating the data $D'_{ir}$ and $D_{xr}$ furnishing a signal ABSCORR to the input of the logic device 12, the phase discriminator 11 furnishing the signal $\phi_o$, said device 12 delivering the phase change demand signal PAP or the switching demand signal N. When the testing device 18 has considered as correct the test of the digital trains, it furnishes the switch order signal N to the input of the switching device 14. The device 14 receives the signals $D'_{ir} + H'_{ir}$ after the equalization of the channel i, as well as the signals $D_{xr} + H_{xr}$ of the backup channel and effects a synchronous switching of the trains to furnish at the output a train $D_i + H_i$ without adding nor subtracting any transition just at the moment of switching, this being at the rate of its own signal $H_i$.

In fact, the above-mentioned switch 14 receives the two synchronous signals $D'_{ir}$ and $D_{xr}$. The phase difference between the signal $H_1$ and $H'_{ir}$ or switched $H_{xr}$ is adjusted so that the switching of the clocks takes place when $H'_{ir}$ and $H_{xr}$ are both at the zero state, taking into account the maximum deviation iu/P of period possible.

Such a phase change device 13 may thus be disposed in the reception gate of the backup channel and be used during switching of the n channels for which this additional channel x serves as back-up. The present invention thus enables the equipment to be simplified and allows a saving in production and consumption. In addition, the use of one variable delay device placed on the backup channel avoids the problems of convergence associated with the use of a delay device not being able to operate on a channel in service.

In addition, the structure of the digital train variable phase shift device 13 makes it possible to increase the range of automatic compensation by increasing only the capacity of the buffer 175 of FIG. 10 without modifying the other elements of the switching system according to the invention.

The variable phase shift device according to the invention is sufficiently rapid to effect switching of a radio channel i degraded by a fading in such a time, of the order of one millisecond, that the switching takes place before the quality has reached a level unacceptable even for the most rapid fadings.

In addition, the variable phase shift device according to the invention stores in the display device 17 the propagation time difference ($\Delta t = miu/P$) between the normal channel backed up and the backup channel after each switching and after each return to the normal channel as long as another normal channel does not take the backup. Such a property allows an easy display of the propagation time difference even in service, without using cumbersome and expensive measuring equipment such as generators and oscilloscopes. This ensures permanent monitoring of the balancing of the propagation times of the radio channels and possible balancing thereof without interrupting the traffic.

What is claimed is:

1. A system for detecting and correctng the phase differences between the respective input digital signal trains of a normal and a switchable backup transmission channel, which ostensibly have identical data streams and clocking, wherein said system comprises:

(a) a data-pulse comparing means for determining the coincidence of corresponding data bits between the two input signal trains whereby an output signal (DIV) is generated by said comparing means with the occurrence of at least one noncoincidence between corresponding data pulses within a predetermined time interval;

(b) a master clocking means for enabling said data-pulse comparing means for said predetermined time interval and connected thereto and whose time base is identical with the clocking of said digital signal trains;

(c) a first latching means connected to the output of said data-pulse comparing means for memorizing said output signal (DIV) for a period h, which corresponds to a packet of a predetermined number of whole bits in said data streams, whereby said latching means generates an output signal (PER) after said period h when there exists at least one noncoincidence among previously compared corresponding pulses in a given packet;

(d) a second latching means connected to receive the output of said first latching means for memorizing said output signal (PER) for said period h, whereby said second latching means generates an output signal (NoCo) after said interval h when there exists at least one noncoincidence in a preceding packet;

(e) a local oscillator connected to enable simultaneously the memorizing actions in both said latching means wherein the time base of said oscillator is equal to period h;

(f) a pulse upcounter connected to said control latching means for counting its output pulses (NoCo) up to a maximum selectable number q in an interval between strobing pulses (INIT), whereby said upcounter generates an output signal (ABSCORR), indicative of a phase mismatch between the two compared digital signal trains, whenever said maximum count q is reached;

(g) a timing and gating means connected to said upcounter to provide it with strobing pulses (INIT) after every elapse of a selectable interval $t_1$ and also connected to said upcounter's output whereupon receiving this output signal (ABSCORR) said timing and gating means is initialized jointly upon the receipt of a phase-search signal (REC) through a separate input, and whereupon said timing and gating means generates a second output signal (TTEST) at a separate output in the absence of a received signal (ABSCORR) from said upcounter during said initialized interval $t_1$;

(h) a clock-phase discriminator which monitors and compares, through conventional sampling interconnections, the time bases of the two digital signal trains and generates an output signal ($\phi$o) when there exists a significant phase difference between said time bases;

(i) A decision circuit whose inputs include connections to said timing and gating means and to said clock-phase discriminator, whereby, if the output signal from this latter input ($\phi$o) is received within an interval $t_1$ of the receipt of the second output signal from this former input (TTEST), an output signal (ABSPHA) is generated by said decision circuit, and wherein said decision circuit is further connected to and initialized by the strobing-pulse output (INIT) of said timing and gating means, and wherein said decision circuit generates a channel-status signal (N) which is indicative of whether the normal transmission channel has been switched in favor of said backup channel;

(j) an XOR-type comparator whose duly connected inputs include said channel-status signal (N) and a channel-switch command signal ($T_{ri}$), whereby said XOR-type comparator generates said phase-search signal (REC) for transmission to said timing and gating means;

(k) a switching circuit connected to said pulse upcounter and to said decision circuit, whereby an output signal from at least one such input (ABSCORR and/or ABSPHA) will cause said switching circuit to emit a control signal (PAP);

(l) a phase-shifting means connected to receive and respond to said control signal (PAP) from said switching circuit such that the phase of the switchable backup digital train is varied on a demand basis; and (m) means for conducting and sampling said two digital signal trains with respect to the system for detecting and correcting phase differences therebetween and means for generating said channel-switch command signal ($T_{ri}$) which serves as an independent demand indicator for said system that the transmission of data is about to be switched from the normal channel to the backup channel, thereby initializing the operation of said system.

2. The system according to claim 1 wherein said phase-shifting means varies the phase of said backup digital train on a demand basis according to step jumps equal to iu/p, wherein p is an integer which is determined by the jitter tolerance of external, downstream transmission equipment, and wherein iu is equal to the period of the time base of said master clocking means.

* * * * *